United States Patent Office 3,822,142
Patented July 2, 1974

3,822,142
ETCHING PRIMER FOR CONCRETE FLOOR
SURFACES CONTAINING SULFURIC ACID
Eric Arntson, Minneapolis, Minn., assignor to
Tennant Company, Minneapolis, Minn.
No Drawing. Filed Jan. 10, 1973, Ser. No. 322,520
Int. Cl. B44d 1/20
U.S. Cl. 117—54                                    10 Claims

ABSTRACT OF THE DISCLOSURE

A liquid conditioning composition for set cementitious surfaces which forms a coherent and stable mass fixed to the cementitious surface, and may be in the form of an adherent coating film in bonded relationship thereto and which includes an aqueous dispersion of sulfuric acid, a surfactant which is preferably in the form of a nonionic and/or cationic emulsifier, and an air curable acid stable miscible resinous binder, along with compatible dispersants. The formulation may be utilized for application to concrete floor surfaces and particularly in a single operation which provides both etching and formation of a conditioning coat.

BACKGROUND OF THE INVENTION

The present invention relates generally to an improved surface conditioner or primer composition for set cementitious surfaces, and more specifically to a stable surface conditioner which may be applied to the surface being treated in a single application, and having a sulfuric acid etching component present in the formulation along with a surfactant in the form of a nonionic and/or cationic emulsifier. An air curable acid stable miscible resinous binder is also present in the dispersion, along with compatible constituent dispersants which normally aid in surface penetration. The composition of the present invention is utilized for conditioning the surface for the purpose of promoting adhesion and for reducing the time and labor required for preparation of a concrete floor to be coated with a paint, varnish or enamel top coat. Urethane coatings are frequently employed for such finish or top coats.

In the past, it has been common practice to apply films or coatings to concrete floor surfaces, these coatings having traditionally been prepared from oleoresinous or rubber-based varnishes. These materials normally possess rather poor wear resistance, and rapidly deteriorate and become generally non-cohesive under continuous foot and wheel traffic after only limited use.

As the quality of films has improved, the wearing characteristics also improved and as a result, the adhesion characteristics have become a limiting factor with regard to the effectiveness of the coating. It was found that adhesion to concrete could be improved by etching the concrete with an acid, normally muriatic acid, which either establishes or opens pores in the concrete surface by attacking the calcium carbonate and other salts. Since concrete surfaces possess intrinsic alkalinity due to the presence of these materials, they react preferentially with the acid. In the past, upon completion of etching, the concrete surface was normally thoroughly scrubbed and rinsed to remove the residual salts formed during the etching operation, and thereafter was permitted to dry. The etched and dried surface may then be coated with the desired coating or film-forming material.

The conditioning of a concrete floor surface to receive a tough urethane coating is normally a multi-step process including the following operations: (1) cleaning, scrubbing and rinsing to remove dirt and soil; (2) etching the surface with acid, with subsequent removal of residual salts through scrubbing and rinsing; (3) drying the surface; and (4) applying a conditioner (such as silanes, fluosilicates or the like), primer or other initial coat to the surface for providing adhesion to the concrete; (5) permitting the conditioner or primer to dry; and (6) applying a top coat of urethane to the dry primer surface.

While the etching of an intrinsically alkaline concrete floor with muriatic acid (hydrochloric acid) has been found to improve surface adhesion of the top coat, this improvement is obtainable only when the treatment is followed with a thorough rinse with ultimate removal of residual salts from the surface. Such rinsing and removal operations require the use of substantial quantities of water which results in the ultimate removal of substantial quantities of residual salts in the form of sludge and the like from the floor surface. Furthermore, the etched and rinsed floors must be permitted to thoroughly dry before a film-forming coating may be applied thereto.

Typically, since the residual calcium chloride salt is highly hygroscopic, the salt will retain substantial quantities of moisture under exposure to humid environments. Because of this moisture retention characteristic, subsequent coating of the floor will normally be ineffective or impaired due to the failure of the film-forming material to achieve proper wetting and pore penetration, thus resulting in poor adhesion. In other words, the treatment of the surface prior to application of any film-forming material will determine the manner in which the applied coatings will adhere to the surface.

In order to enhance finish coat adhesion, concrete floor primers have been developed. Two-component systems utilizing epoxy resin as a film-forming component in the primer have been formulated and reasonable adherence has been achieved. Such systems are somewhat time consuming to employ inasmuch as two operations are required for priming (etching and coating) and two separate components are required. Silane and fluosilicate materials have also been utilized, these materials also requiring a tight, dust-free surface for application. While latex primers have been proposed and utilized, they have generally been found to be ineffective due to limited wetting of the concrete, thus reducing the effective adhesion.

SUMMARY OF THE INVENTION

In accordance with the present invention, a one-package, single operation etching concrete surface conditioner or primer has been formulated which will eliminate certain of the steps previously required in the priming procedure described above. While the cleaning, scrubbing and rinsing operation is always a prerequisite, the remaining steps may be accomplished by the application to the floor surface of the etching conditioner at an appropriate application rate. The concept of the present invention permits the effective combining of etching and either conditioning or priming, thus eliminating the complex procedures whch are normally associated with acid etching. This effective combination is achieved through the formulation of a stable one-package etching conditioner or etching primer which consists of an aqueous dispersion of sulfuric acid, acid miscible resinous binders and a surfactant preferably in the form of a nonionic or cationic emulsifier. The salts of sulfuric acid formed during etching are generally non-hygroscopic and virtually insoluble in water. The acid miscible resinous binder is preferably of the hard and horny type. The emulsifiers which are included in the formulation are either nonionic and/or cationic, and in addition to stabilizing the solution, assist in wetting of the surface being covered. Dispersants may be utilized also. While nonionic and cationic emulsifiers have been suggested, it will also be appreciated that ampholytic emulsifiers may also be employed, these having the characteristic of being either anionic or cationic depending upon the environment, and will become cationic in the present formulations.

Therefore, it is a primary object of the present invention to provide an improved stable one-package etching primer having a formulation which permits the combination of etching and either conditioner or primer coating operations through a single application of the formulation.

It is yet a further object of the present invention to provide an improved stable one-package etching conditioner or etching primer for concrete floor surfaces having intrinsic alkalinity which employs sulfuric acid as the acid component and which eliminates the requirement of subsequent removal of residual salts from the surface.

Other and further objects of the present invention will become apparent to those skilled in the art upon a study of the following specification and appended claims.

DESCRIPTION OF THE PREFERRED EMBODIMENT

As has been previously indicated, the formulation of the present invention consists essentially of an aqueous dispersion of sulfuric acid, emulsifiers, and a resinous binder. The general characteristics of these various components and their function in the formulation will be provided hereinbelow.

Acid constituent

Sulfuric acid is provided in the formulation in a range which may be preferably between 15% and 30%, with the preferred concentration being from 15% to 20%. This concentration of acid in the formulation provides for sufficient acid concentration to accomplish the etching. The nonionic or cationic surfactants in the solution enhance stability. It will be appreciated that stability may be obtained while using a variety of binders, surfactants (emulsifiers) and dispersants.

As has been indicated, the acid reacts with the calcium carbonate and other alkaline materials on the surface as well as that present in the pores of the concrete. The carbon dioxide which is released in the chemical reaction during etching lifts or "floats" at least a portion of the residual calcium salts from the matrix of the concrete. This etching action also has been found to loosen and lift substantial quantities of dirt which may be present on the otherwise apparently clean surface, with the dirt including both inorganic and organic residues. Thus, during etching, the surface of the concrete is cleaned and roughened and additional pores or pore sites are created. It has been learned that the residual salts and other residues generated during this operation have low water of hydration and tend to be intrinsically more dry. The residue, while rendered immobile in the resinous binder holds together otherwise loose debris, and retains this material in immobile or captive state on the surface of the floor being treated. The etching "reactive site" immediately becomes a "deposit site" for the resinous binder which is preferably present in the formulation, the binder, when used, being carried into the pores of the surface as these pores are opened or formed by the action of the etching acid. In addition, the resinous binder will coat the individual particles of inorganic and organic residue which are lifted from the surface during the etching operation, and thus incorporate them into the film and immobilize them. The binder also renders the normal surface character less hydrophilic and in effect converts the surface to one which is more generally hydrophobic in character. Hydrophobic surfaces become more receptive to top coats and enhance the wetting and cohesion of the coating.

One characteristic feature of the sulfuric acid is that the insoluble salt of the calcium residue is generally insoluble in water. Such a characteristic is of value in the concept. The insoluble characteristic of the residue causes the floor surface to become dry much more rapidly than floors etched with other acids, or even when wet with plain water. Other commonly used etching acids such as hydrochloric results in calcium salts that are highly hygroscopic and which contain larger amounts of bound water. Floors wetted only with water contain highly hygroscopic constituents which hold water tenaciously.

Resinous binder

The preferred formulation of the present invention utilizes a low solids solution or dispersion of a resin which, because of the formulation, is given exceptional penetrating and bonding capability. By low solids, it is contemplated that the solution or dispersion will contain from between about 2% and 10% of resinous material, with a preferred quantity being about 5%. It can be noted at this point, however, that resinous binder contents ranging up to about 30% may be found useful. Because of the nature of the materials being employed, a low pH system or acid compatible system must be employed.

The resinous binder employed preferably becomes hard upon curing. For example, it is generally desirable that the products have a Sward hardness of at least as high as about 30 and preferably up to about 40. The use of such binders in the formulation provides primer materials which have been found to provide an excellent base to receive a finish coating, with the composite films having exceptionally high peel strengths. Softer resinous binder materials generally result in coatings having somewhat lower peel strength properties.

A further function of the resinous binder is to modify the characteristics of the concrete surface from one which is generally hydrophilic in nature to one which is generally hydrophobic as set forth above. This change in character is achieved through the application of the material to the surface.

As has been indicated hereinabove, the reactant site becomes a deposit site, and the simultaniety of the process provides a system which performs better as a single package system than is obtainable when the same components are utilized on a two-stage basis.

Among the resinous materials which may be employed are the following: (a) polyvinyl acetate; (b) acid soluble amine modified resinous polymers; (c) diacetone acrylamideacrylic copolymers; (d) acryic copolymers, specifically aqueous dispersions of acrylic copolymers; or (e) PVA blended with urethane, preferably on a 90:10 basis.

PVA may be used in either homopolymer or copolymer form, with these materials being commercially available as latex materials or substances. Frequently, latex binders will function as an emulsifier in the dispersion or solution.

Acid soluble amine modified resinous polymers such as the amine adduct of diacetone acrylamide are commercially available. Such resins, which are available under the code name "Lubrizol CA–21" from the Lubrizol Corporation of Cleveland, Ohio, also function as emulsifiers in the solution. Such materials preferably have a moderate chain length. It has also been discovered that in the sulfuric acid system, normally in relatively low quantities, such as less than about 10%, the amines which may be employed react, combine, or otherwise function with sulfuric acid, which in turn react, combine, or otherwise function with calcium ions to form a stable and immobile agglomerate. Dimerized linoleic acid with terminal amine groups has been found useful.

Acrylic copolymers which are useful specifically include diacetone acrylamide-acrylic copolymers which are commercially available under the code name of "Lubrizol 2240" latex, and in particular, from the Lubrizol Corporation of Cleveland, Ohio.

A blend of urethane and polyvinyl acetate may also be employed, with the urethane constituent comprising from 5% to 25% of the resinous material, balance polyvinyl acetate. Such materials are also commercially available.

It will be appreciated that a major function of the conditioner of the present invention is to convert the surface from one which is primarily hydrophilic to one which is primarily hydrophobic in character. It is this conversion which enhances the ability of the treated concrete surface to accept an organic finish coating to provide a durable surface.

In order to better comprehend the concepts of the invention, the following specific examples are provided:

Example 1

| Component: | Pounds |
|---|---|
| Sulfuric acid (93%) | 206 |
| Nonionic nonylphenoxyethanol (surface-active agent) | 5.6 |
| Dimerized linoleic acid with terminal amine groups | 2 |
| Polyvinyl acetate-urethane copolymer (90:10 ratio in aqueous dispersions, 54% solids) | 73.0 |
| Mineral spirits | 13 |
| Water | 600 |

In order to prepare the dispersion, the sulfuric acid, surfactant and dimerized linoleic acid constituents are added to 500 pounds of water with good agitation to disperse and dissolve. The aqueous dispersion of polyvinyl acetate-urethane material is then added and the composition again mixed well. An additional 100 pounds of water and the mineral spirits are added, with the entire composition being again mixed. The finished product has a weight of 9.27 pounds per gallon, with a sulfuric acid content of 20%, and with resin solids content being 5%.

The various materials set forth in this example are commercially available. The polyvinyl acetate-urethane material is available from National Starch and Chemical Corp. of New York, N.Y., under the code name "Resyn 25-5005."

Dimerized linoleic acid with terminal amine groups is available commercially from General Mills Company of Minneapolis, Minn. under the designation "Versamide 125."

This formulation possesses a shelf-life in excess of six months, and up to one year.

Example 2

| Component: | Pounds |
|---|---|
| Sulfuric acid (93%) | 206 |
| Nonionic nonylphenoxyethanol (surface-active agent) | 6 |
| Polyamide (dimerized linoleic acid with terminal amine groups as in Example 1) | 2 |
| Diacetone acrylamide-acrylic resin (70:30 ratio in aqueous dispersion, 45% solids) | 87 |
| Mineral spirits | 13 |
| Water | 500 |

The sulfuric acid is added to 400 pounds of water, and thoroughly mixed. The surface active agent, which also functions as an emulsifier, along with the polyamide material are then dispersed along with slow agitation of the mix. The 87 pounds of diacetone acrylamide-acrylic copolymer resin material, pre-mixed with 83 pounds of water is then added to the mixture. The mineral spirits and balance of water are then added to the composition and thoroughly mixed. The product has a weight of 9.24 pounds per gallon, with a resinous binder content of 5%, and an acid content of 20%.

Example 3

The composition of Example 1 was prepared utilizing 155 pounds of sulfuric acid in lieu of the quantity employed in Example 1 to provide a useful composition.

Example 4

The composition of Example 1 was modified to provide a mixture containing 25% sulfuric acid, with 258 pounds of sulfuric acid being employed in lieu of that set forth in Example 1, with a useful product being obtained.

Example 5

| Component: | Pounds |
|---|---|
| Sulfuric acid (93%) | 206 |
| Acid soluble amine modified resinous polymer (amine adduct of diacetone acrylamide 70:30 ratio in aqueous dispersion, 45% solids) | 48 |
| Mineral spirits | 13 |
| Water | 625 |

The sulfuric acid is added to 250 pounds of water, and mixed vigorously. The resinous polymer is then added to the acid-water mixture, and mixed until thoroughly dissolved. The balance of the water and the mineral spirits are then added to provide a finished product having a weight of 9.22 pounds per gallon, a sulfuric acid content of 20%, along with a binder content of 5%. The resinous polymer material is commercially available from the Lubrizol Corporation under the code name "CA-21."

In each of the above Examples 1-4 inclusive, utilizing an emulsion type resinous binder, a blend of nonionic and cationic emulsifiers are preferably utilized to provide suitable package stability, and also provide ease of application. It has been found that if the emulsifier is not included in the formulation, its package stability may be limited due to incompatibility of certain latex emulsions in mineral acid. In certain instances, it may be desirable to utilize a two-package system wherein the acid is maintained separate from the latex emulsion, however it has been found that this is not required in most instances unless exceptional or unusually long shelf-life may be required.

It has been further found that the inclusion of the blend of emulsifiers such as those shown in Examples 1-4, inclusive, enhances application of the product to concrete floor surfaces. If such emulsions are not incorporated in the formulations, a residue may form from the reaction of sulfuric acid with the calcium ions of the concrete floor, the residue coagulating relatively quickly. The coagulated residue may interfere with proper spreading of the primer or conditioner material on the floor surface. With these emulsifiers present, the residue will remain dispersed for a longer period of time, therefore allowing for proper and uniform spreading of the material over the floor surface.

The cationic component of the emulsifier blend that has been found to provide the desired retardation of etch residue coagulation is a reaction product formed by dissolving an organic amine, such as amine terminated dimerized linoleic acid as an example, in sulfuric acid during preparation of the formulation.

A simple standard has been devised which effectively differentiates the emulsifiers that may provide the necessary retardation of etch residue coagulation. Powdered calcium carbonate is added to a test formulation, such as those illustrated in Examples 1-5 inclusive. The action of the sulfuric acid on the calcium carbonate creates foam from the liberation of $CO_2$. Upon stirring, the foam breaks and the residue of calcium salts and resinous binder will either almost immediately coagulate, or will remain in a liquid state for several minutes, depending upon the emulsifier being utilized in the formulation. It has been found that formulations providing a liquid residue for several minutes in the test possess the necessary characteristics for smooth, non-streaked application by conventional techniques, including rollers or brushes.

Furthermore, cationic emulsifiers as indicated above have been found to provide the desired retardation of etch residue coagulation.

While a variety of resinous binder materials have been discussed, it may be appreciated that others may also be found useful. A variety of such materials are, of course, commercially available, it being recalled that the resin material preferably has a Sward hardness in the range of at least about 30 and particularly up to about 40.

It will be appreciated that the sulfuric acid etchant along with the other components of the formulation convert the cement surfaces from one which is relatively hydrophilic to one which is far less hydrophilic and tends toward being hydrophobic. The compositions form a water insoluble, organic receptive film on the surface of the cement or concrete. While synthetic resinous materials are normally preferred, casein may be utilized satisfactorily when incorporated in a typical formulation with a 2% solids base. Casein is essentially an acid soluble resin which leaves an etch residue consisting of calcium caseinate. The primary feature to recall is that the calcium sulfate provides the insolubility feature for the surface, thus causing the characteristic to move toward hydrophobic from its normal hydrophilic character.

With regard to the sulfuric acid concentration, it would appear that both acid groups are being expended in the etching operation, with most concrete or cement surfaces having a pH of between about 8 or 9.

Mineral spirits is included in the formulation as a defoamer to quickly break any foam which may form on the surface of the floor. Accordingly, a more accurate visual evaluation of the uniformity of spreading may be made. The emulsifier utilized may also affect the rate of foam breaking. An oil soluble nonylphenoxyethanol that contains from 4 to 5 mols of ethylene oxide will provide rapid foam breaking. Such materials are, of course, commercially available. Such compositions are preferred to those similar nonionic emulsifiers containing larger amounts of ethylene oxide. The level of cationic emulsifier is deemed critical in obtaining the desired foam breaking characteristics of the composition. Excessive quantities of organic amines may cause poor foam breaking properties on concrete floors. Levels below those illustrated in Examples 1–4 inclusive, may result in early coagulation of etch residue. The level set forth in these examples appears to be optimum for allowing fast breaking of foam while still providing for the necessary retardation of etch residue coagulation.

The various formulations set forth in the specific examples provided herein are given for purposes of comprehending the concept of the present invention and are not provided for the purposes of limitation.

What is claimed is:

1. Liquid conditioner composition for preparing set cementitious surfaces and for converting the cementitious surface to a hydrophobic surface and comprising:
    (a) an acid etching component consisting essentially of sulfuric acid and being present in said composition in an amount ranging from about 15% to 30%;
    (b) an emulsifier selected from the group consisting of nonionic and cationic emulsifiers; and
    (c) an acid stable miscible resinous binder capable of curing in air to a substantially cohesive film present in said composition in an amount ranging from about 2% to 30%.

2. The liquid conditioner composition as set forth in Claim 1 being particularly characterized in that said sulfuric acid is present in an amount ranging from between about 15% and 20%.

3. The liquid conditioner composition as set forth in Claim 1 being particularly characterized in that said acid stable miscible resinous binder is present in an amount ranging from between about 2% and 10%, with said resinous binder being selected from the group consisting of polyvinyl acetate, acid soluble amine modified resinous polymers, diacetone acrylamide-acrylic copolymers, acrylic copolymers, specifically aqueous dispersions of acrylic copolymers, and PVA blended with urethane, substantially on a 90:10 basis.

4. The liquid conditioner composition as set forth in Claim 1 being particularly characterized in that said acid stable miscible resinous binder consists of a blend of 90% polyvinyl acetate, balance urethane.

5. The liquid conditioner composition as set forth in Claim 1 being particularly characterized in that said acid stable miscible resinous binder consists of polyvinyl acetate.

6. The method of conditioning a set cementitious surface for receiving an adherent and coherent plastic resinous top coat film thereon which method comprises:
    (a) applying an etchant and sealant composition to said cementitious surface which comprises:
        (1) an acid etching component consisting essentially of sulfuric acid and being present in said composition in an amount ranging from about 15% to 30%;
        (2) an emulsifier selected from the group consisting of nonionic and cationic emulsifiers; and
        (3) an acid stable miscible resinous binder capable of curing in air to a substantially cohesive film present in said composition in an amount ranging from about 2% to 30%; and
    (b) drying said surface to form a coherent residue affixed to said surface.

7. The method of conditioning a set cementitious surface as defined in Claim 6 being particularly characterized in that said acid etching component in an amount ranging from between about 15% and 20%, and an emulsifier selected from the group consisting of nonionic and cationic emulsifiers are persent.

8. The method of conditioning a set cementitious surface as defined in Claim 6 being particularly characterized in that said sulfuric acid is present in an amount ranging in that said sulfuric acid is present in an amount ranging from between about 15% and 20%.

9. The method of conditioning a set cementitious surface as defined in Claim 6 being particularly characterized in that said acid stable miscible resinous binder is present in an amount ranging from between about 2% to 10%, with said resinous binder being selected from the group consisting of polyvinyl acetate, acid soluble amine modified resinous polymers, diacetone acrylamide-acrylic copolymers, acrylic copolymers, specifically aqueous dispersions of acrylic copolymers, and PVA blended with urethane, substantially on a 90:10 basis.

10. The method of conditioning a set cementitious surface as defined in Claim 6 being particularly characterized in that said acid stable miscible resinous binder consists of a blend of 90% polyvinyl acetate, balance urethane.

References Cited
UNITED STATES PATENTS

| | | | |
|---|---|---|---|
| 3,376,155 | 4/1968 | O'Donnell | 117—54 X |
| 3,723,163 | 3/1973 | Schumacher | 117—54 X |

WILLIAM A. POWELL, Primary Examiner

U.S. Cl. X.R.

156—2; 252—79.4; 260—29.6 MQ, 29.6 RW, 29.6 Z, 29.6 NR

UNITED STATES PATENT OFFICE
CERTIFICATE OF CORRECTION

Patent No. 3,822,142          Dated July 2, 1974

Inventor(s) Eric Arntson

It is certified that error appears in the above-identified patent and that said Letters Patent are hereby corrected as shown below:

Column 8, line 34, in Claim 7, the word "persent" should read -- present --.

Column 8, line 37 is repeated at line 38.

Signed and sealed this 1st day of October 1974.

(SEAL)
Attest:

McCOY M. GIBSON JR.
Attesting Officer

C. MARSHALL DANN
Commissioner of Patents